United States Patent [19]

Norris

[11] 4,273,433
[45] Jun. 16, 1981

[54] TWO-BLADED SHUTTER MECHANISM FOR MICROFICHE CAMERA

[75] Inventor: Philip R. Norris, North Reading, Mass.

[73] Assignee: Polaroid Corporation, Cambridge, Mass.

[21] Appl. No.: 98,492

[22] Filed: Nov. 29, 1979

[51] Int. Cl.³ .................. G03B 9/40; G03B 27/32
[52] U.S. Cl. ..................... 354/246; 355/64
[58] Field of Search ............ 354/246, 261, 123, 125; 355/53, 64

[56] References Cited

U.S. PATENT DOCUMENTS

| | | | |
|---|---|---|---|
| 2,259,084 | 10/1941 | Rosenhaft | 354/123 |
| 2,267,794 | 12/1941 | Kosken | 354/246 |
| 2,457,679 | 12/1948 | Jones | 354/246 |
| 2,478,641 | 8/1949 | Rose et al. | 355/64 |
| 3,062,090 | 11/1962 | Ferrari et al | 352/206 |
| 3,082,673 | 3/1963 | Takahama | 354/246 |
| 3,326,105 | 6/1967 | Brandt et al. | 354/147 |
| 3,430,547 | 3/1969 | Norton | 354/261 X |
| 3,461,784 | 8/1969 | Burgarella | 354/234 |
| 3,461,785 | 8/1969 | Ivester | 354/234 |
| 3,468,228 | 9/1969 | Rogers | 354/234 X |
| 3,491,672 | 1/1970 | Johnson | 354/261 X |
| 3,533,346 | 10/1970 | Erlichman et al. | 354/234 |
| 3,545,352 | 12/1970 | Bellows | 354/234 |
| 3,557,678 | 1/1971 | Bellows | 354/234 |
| 3,642,369 | 2/1972 | Wells | 355/64 |
| 3,709,125 | 1/1973 | Willey | 354/4 X |
| 3,778,151 | 12/1973 | Zimmet | 355/53 |
| 3,946,414 | 3/1976 | Kitai | 354/246 X |
| 3,952,317 | 4/1976 | Galbraith | 354/246 X |
| 4,027,315 | 5/1977 | Barney | 354/123 X |

Primary Examiner—Donald A. Griffin
Attorney, Agent, or Firm—John S. Vale

[57] ABSTRACT

A simply constructed two bladed shutter mechanism is provided for use in a photographic apparatus such as a microfiche camera having a scanning optical system for exposing a plurality of micro image areas on a single cardlike film unit. The camera lens is incrementally advanced to successive imaging positions by a rotatable barrel cam which also carries and rotates one or more shutter control pins for operating the shutter in coordination with advancement of the lens. In response to rotation of the one or more control pins with the barrel cam, shutter opening and closing blades are released sequentially from a cocked position for movement to effect exposure of an image area and thereafter are recocked.

15 Claims, 13 Drawing Figures

TWO-BLADED SHUTTER MECHANISM FOR MICROFICHE CAMERA

BACKGROUND OF THE INVENTION

The present invention relates to the field of photography and, more specifically, to a simply-constructed, two-bladed shutter mechanism and photographic apparatus, such as a microfiche camera, which includes such a shutter mechamism.

Commonly-assigned copending application U.S. Ser. No. 071,939 filed on Sept. 4, 1979 by V. L. Cocco, P. R. Noris and R. R. Wareham discloses and claims a microfiche system comprising a microfiche camera, a microfiche projector, and a console having a mount thereon for interchangeably receiving either the camera or the projector.

With the camera mounted on the console, the system is operative in a recording mode for exposing a plurality of image areas on a card-like film unit, preferably of the self-developing type, with images of successive documents supported on a mounting glass on the console. Following the exposure of the last image area, the film unit is processed by advancing it between a pair of camera mounted pressure applying rollers. Thereafter, the system may be converted to a viewing mode by removing the camera from the mount and replacing it with the projector and also covering the document mounting glass with a translucent rear projection screen. The processed film unit is located in the projector which is operative to project an enlarged image of any microimage area thereon onto the screen for viewing. The microfiche system is charcterized by its simplicity of construction and low cost thereby making it affordable to small businesses or other organizations which may not be able to justify the capital outlay for more expensive conventional microfiche systems or services.

The microfiche camera is designed to expose a plurality of image areas arranged in orthogonal lateral rows and longitudinal columns. Typically, there may be 49 such image areas provided on a generally square image area of the film unit measuring 3.25 inches by 3.25 inches.

To record a row of images on the film unit, the camera is provided with a lens mounted for movement over a lateral row of framing gate apertures that define the image areas on the film unit and means for advancing the lens in increments to successive imaging positions to locate the lens in imaging relation with each of the image areas in the row. After exposure of the last image area in the row, a film advancing mechanism advances the film unit longitudinally one row position relative to the framing gate apertures to locate the next row of image areas in position for exposure.

Commonly assigned copending application U.S. Ser. No. 071,940 filed on Sept. 4, 1979 by P. R. Norris discloses such a camera and claims certain features thereof including a two-bladed shutter for selectively blocking and unblocking an optical path passing through the lens along which image forming light is transmitted to expose an image area.

The shutter includes an opening blade movable from a blocking cocked position to an unblocking rest position for initiating an exposure, a closing blade movable from an unblocking cocked position to a blocking rest position for terminating the exposure, and means for biasing both of the blades toward their respective rest positions. In a preferred embodiment, means for illuminating the document on the console mounting glass is provided by a camera mounted strobe flash unit which is fired by tabs on the shutter blades when the shutter is in its open condition. Also, the operation of the shutter must be coordinated with the movement of the lens which is driven by a rotatable barrel cam to its sequential imaging positions.

In the illustrated embodiment, the lens advancement and shutter operation is effected by a mechanical actuating system whereby during movement of a cycle button in one direction, the barrel cam is rotated to move the lens to its next postion and the shutter blades, located at the rest position in a closed condition, are moved simultaneously to their respective cocked positions. A latching system is provided for releasably latching the closing blade in the cocked position. In response to releasing the cycle button, it moves in the opposite direction allowing the opening blade to move from the cocked position to the rest position thereby opening the shutter. The strobe unit is fired when the shutter is in its open condition and a projection on the opening blade actuates the latch when the opening blade reaches the rest position to thereby release the closing blade for movement to its rest position to terminate the exposure.

While the shutter works as intended, the provision of the mechanical closing blade latch, the latch release on the opening blade, and structure on both of the blades for coupling them together for simultaneous movement to the cocked position, make the blade and actuating structures more complex and therefore more expensive than is desirable.

Two bladed shutters are, of course, well known in the photographic prior art. Generally, however, these shutters are more mechanically complex and/or costly than is desirable for incorporation into a low cost microfiche camera.

For example U.S. Pat. No. 3,326,105 discloses a two bladed shutter in which the blades are coupled together by an over center toggle spring arrangement for sequential movement. Other shutters rely on separate latches for the opening and closing blades and provide complex arrangements for sequentially unlatchig the blades. Representative examples of such shutter mechanisms are found in U.S. Pat. Nos. 2,457,679; 3,082,673; 3,430,547; and 3,491,672. Another class of two bladed shutters employs an expensive electromagnet for releasably holding the closing blade in the cocked position as shown in representative U.S. Pat. Nos. 3,461,784; 3,461,785; 3,468,228; 3,533,346; 3,545,352; 3,557,678 and 3,952,317.

Some of the mechanical complexity of the above-noted shutters is attributable to a requirement that the shutter speed be variable. In the present application a variable exposure interval is not necessary because the exposure is controlled by a known quantity of light provided during a brief exposure interval by the electronic strobe unit while the shutter is open. Also, many of these shutters are not particularly well suited for incorporation into a microfiche camera where the opeation of the shutter must be coordinated with the movement of the lens between successive imaging positions.

Therefore, it is an object of the present invention to provide a simply constructed and low cost two bladed shutter mechanism.

It is another object to provide such a shutter mechanism that is suitable for use in a low cost microfiche camera and is an improvement over the shutter disclosed and claimed in the previously-noted application U.S. Ser. No. 071,940.

Another object is to provide a photographic apparatus, such as a microfiche camera, having a simple mechanically actuated two bladed shutter that is automatically actuated during the course of cycle of camera operation in coordination with the incremental movement of the camera's objective lens.

Yet another object is to provide such a camera wherein means for controlling the movement of the opening and closing blades are directly coupled to and are operated by structure for incrementally advancing the lens along a path of travel to successive imaging positions.

Other objects will, in part, be obvious and will, in part, appear hereinafter.

SUMMARY OF THE INVENTION

The present invention provides a simple constructed and low cost two bladed shutter and a photographic apparatus, preferably a microfiche camera, which utilizes such a shutter and therefore is particularly well suited for use in a low cost microfiche system of the type described above.

The shutter comprises an opening blade mounted for movement between an initial blocking position and a terminal unblocking position for initiating an exposure; a closing blade mounted for movement between an initial unblocking position and a terminal blocking position for terminating the exposure; structure for biasing both of the blades toward their respective positions; and structure for controlling movement of the shutter blades and including a control member that is mounted for movement between first, second and third positions.

When located in the first position, the control member is operative to engage both of the blades to releasably retain them in their respective initial or cocked positions. In response to movement of the control member from the first to the second position, it becomes disengaged from the opening blade to release it for movement to its unblocking terminal position to initiate the exposure while at the same time remaining in engagement with the closing blade to retain it in the cocked position. Thereafter, in response to movement of the control member from the second to the third position, it releases the closing blade for movement to its terminal position to terminate the exposure.

Additionally, the control member is mounted for movement to a fourth position and the shutter control structure further includes means for resetting the blades back to their respective initial positions, after an exposure, in response to movement of the control member from the third to the fourth position.

The photographic apparatus preferably includes a rotatable barrel cam for incrementally advancing the lens to its successive imaging positions and the structure for controlling the movement of the shutter blades, including the control member, is preferably mounted for rotational movement between the first, second, third and fourth positions. Advantageously the control structure is directly coupled to the barrel cam for simultaneous rotation therewith to minimize the mechanical complexity of the shutter control system and accurately coordinate the operation of the shutter with the incremental movement of the lens.

In the preferred illustrated embodiment, the control member and reset structure include a pair of diametrically opposed pins projecting outwardly from one end of the barrel cam and being rotatable into and out of the path of travel of a short depending control leg or tab on the opening blade and a longer adjacent control leg or tab on the closing blade. In response to rotation of the barrel cam, during a dwell period when the lens is not moved, the control pin initially releasably engages both tabs to maintain the blades in the cocked position. Thereafter the pin becomes disengaged first from the short leg to release the opening blade and then from the longer leg to release the closing blade. In response to further rotation of the cam, the second pin engages both blade legs and resets the two blades.

In the illustrated embodiment, the barrel cam rotates through 180° for each cycle of camera operation and therefore two control pins are used. One to trigger operation of the shutter and the other to recock the blades. In an alternative embodiment, the cam may be configured to rotate through a full revolution (360°) during each cycle of camera operation and a single control pin on the cam may be utilized to perform both the triggering and reset functions.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
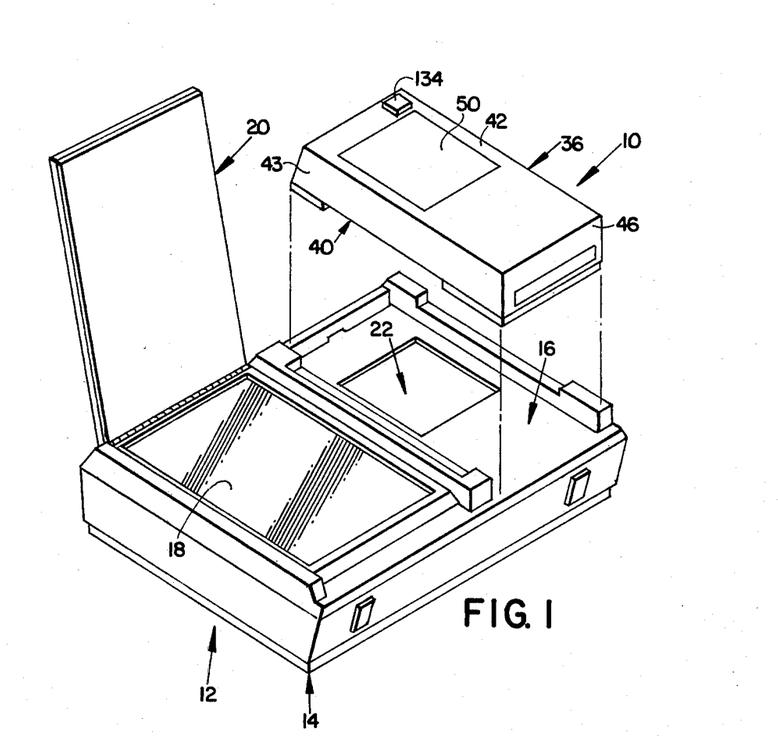
FIG. 1 is an exploded perspective view of a microfiche camera, embodying the present invention, and a console for receiving the camera in position to copy a document supported on the console.
Figure 2:
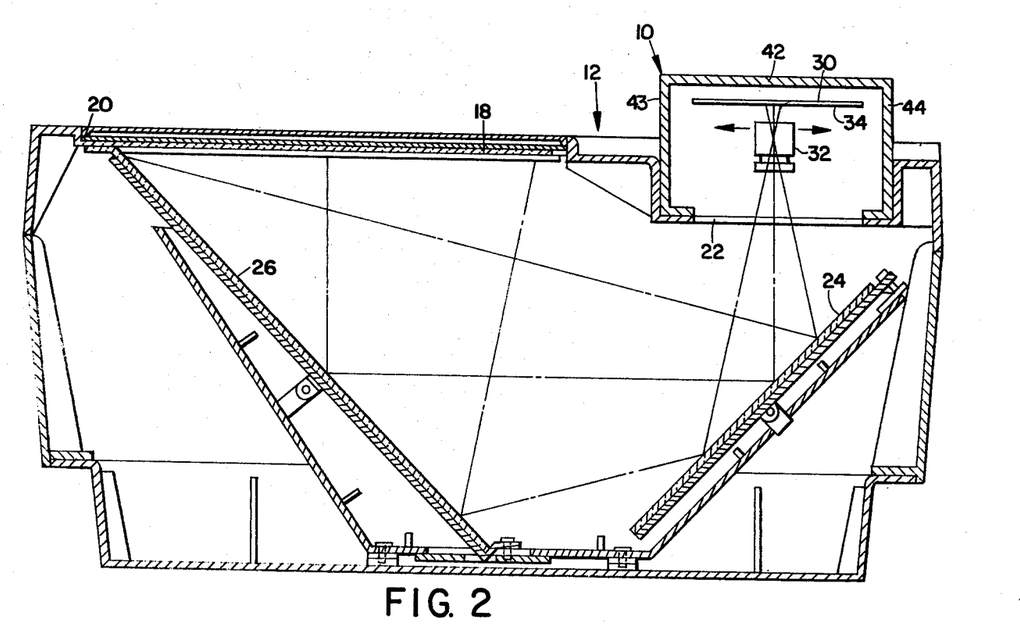
FIG. 2 is a cross-sectional view showing the camera mounted at its operative position on the console.

FIGS. 1 and 2 show two components of a microfiche recording and viewing system which includes a scanning microfiche camera 10, illustrating a photgraphic apparatus emodying the present invention, and a console 12 for releasably receiving camera 10.

Console 12 includes a box-like housing 14 having on its upper surface a camera/projector mount 16 and an adjacent document mounting area defined by a document supporting glass 18 and a hinged cover 20.

Mount 16 is a well-like structure for releasably receiving the forward portion of camera 10 and includes a light transmission aperture 22 that is aligned with a later-to-be-described camera lens and strobe lighting unit when camera 10 is operatively located on mount 16.

The console 12 further includes reflective means in the form of a pair of internally mounted angled mirrors 24 and 26 which define a folded optical path for the transmission of image forming light between the document mounting area and aperture 22.

Figure 5:
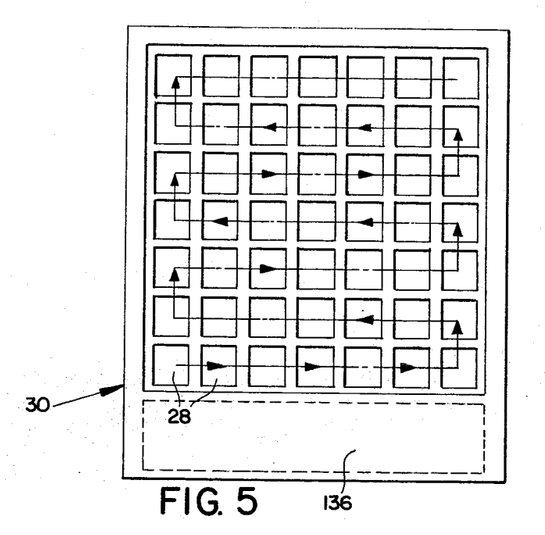
FIG. 5 is a plan view of a self-developing film unit diagrammatically showing a plurality of image areas thereon and the order in which these image areas are sequentially exposed.

As most clearly shown in FIG. 5, camera 10 is configured to expose a plurality of micro image areas 28 arranged orthogonally in linear columns and rows on a single card-like film unit 30 which is preferably of the integral self-developing transparency type described in commonly-assigned U.S. Pat. No. 3,721,562.

In order for camera 10 to expose the image areas 28 in the sequence shown by the arrows in FIG. 5, the camera objective lens 32 is mounted for lateral movement in steps relative to the film plane 34, in response to each actuation of camera 10, to expose a row of image areas 28 with latent images of successive documents supported on glass 18. After the last exposure in the lateral row, a later-to-be-described film advancing mechanism advances film unit 30, longitudinally, one row position and then lens 32 is advanced in the opposite direction to expose the next row of image areas 28. After the last image area 28 is exposed, the film unit 30 is advanced between a pair of later-to-be-described pressure applying rollers for processing in a well-known manner.

After film processing, the microfiche system may be converted from its image recording mode to a viewing mode by removing camera 10 from mount 16 and replacing it with a projector (not shown). The projector includes a self-contained light source and projects an enlarged image of a micro image frame area onto a translucent viewing screen (not shown) placed over glass 18.

For a more detailed description of the microfiche system and its components, reference may be had to commonly-assigned copending applications U.S. Ser. Nos. 071,939; 071,940; and 072,051, all of which were filed on Sept. 4, 1979 and are incorporated by reference herein.

While the present invention is directed to a simply constructed shutter mechanism for use in camera 10, other portions of camera 10 must be described briefly to present the background necessary to understand the present invention.

With reference to FIGS. 1–8, the camera 10 includes a generally box-like housing 36 defined by a hollow base section 38 and a forward wall housing section 40 closing the open top of base section 38.

For ease of illustration the camera 10 is shown in FIGS. 3, 4, and 6–8 with base section 38 at the bottom. However, it will be understood that camera 10 is mounted on console 12 with its forward wall 40 facing the mount 16 as shown in FIGS. 1 and 2.

Figure 3:
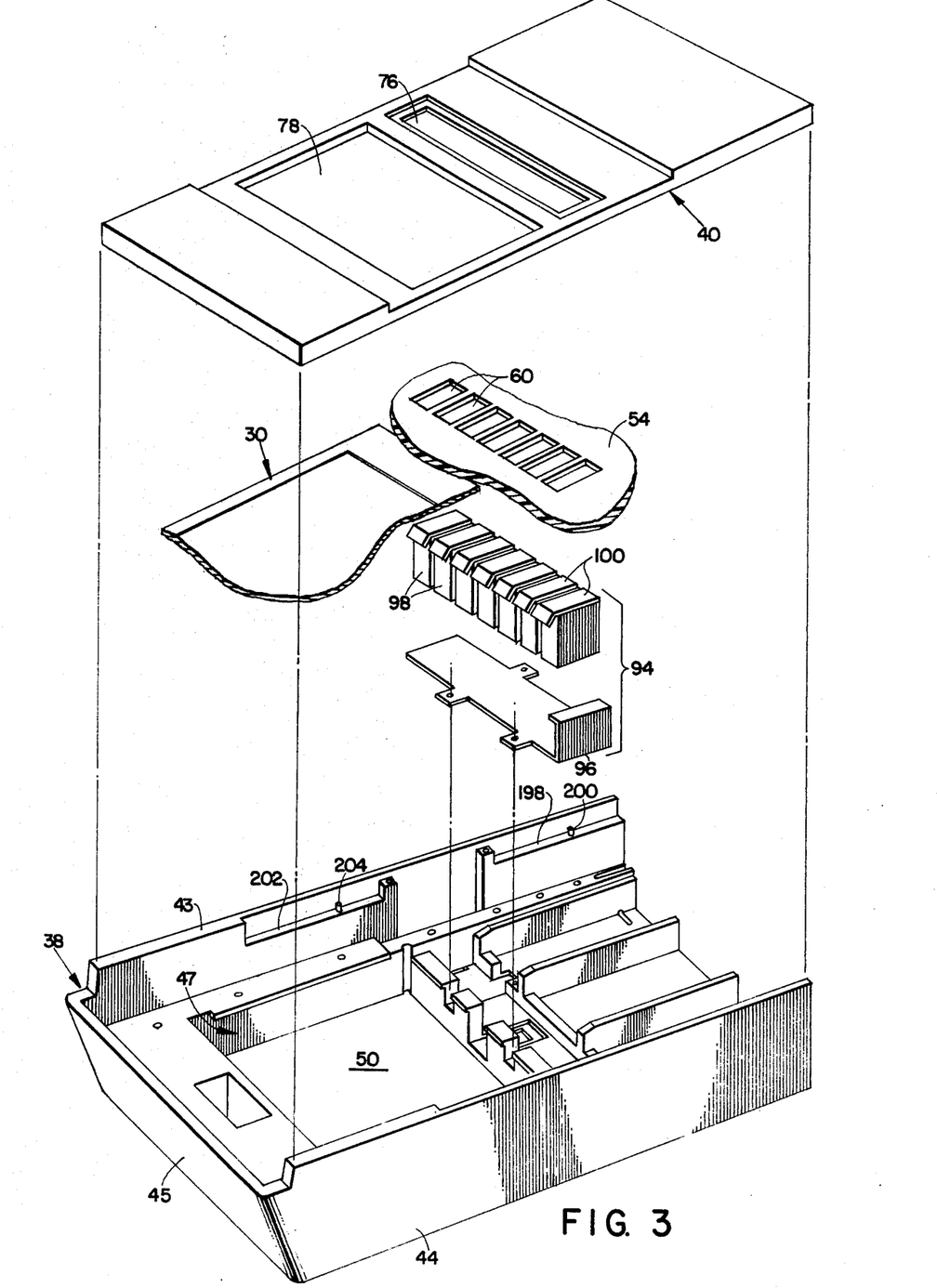
FIG. 3 is an exploded perspective view of selected camera components.
Figure 6:
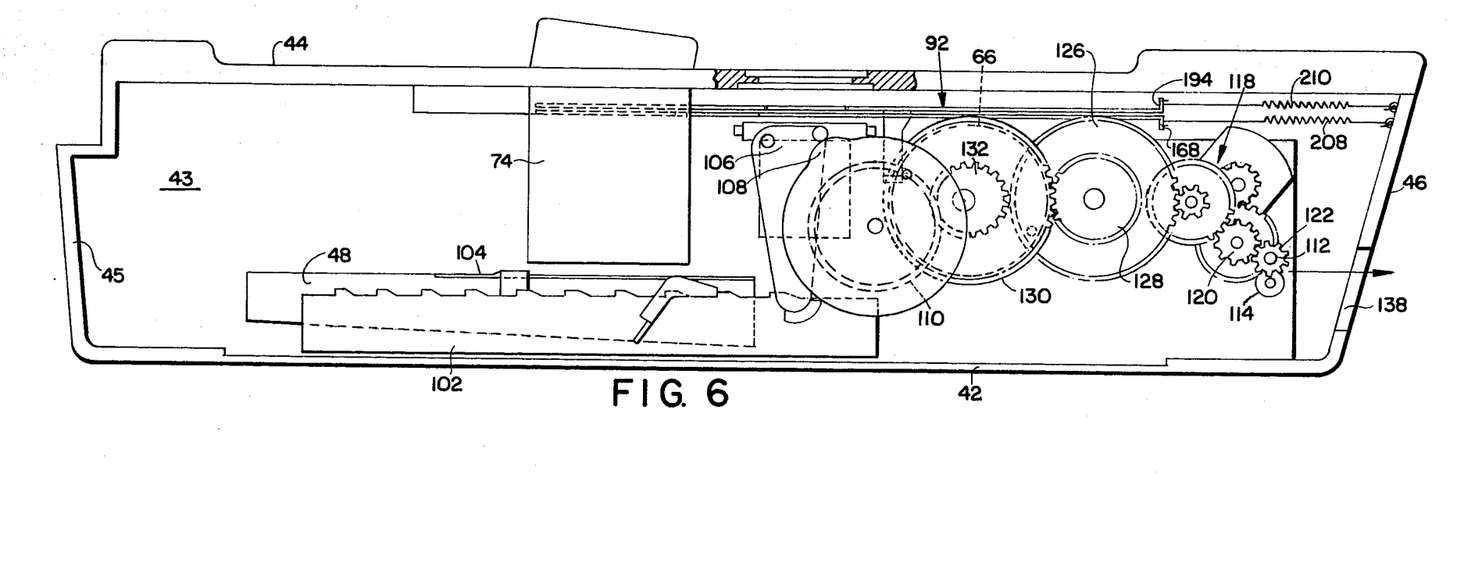
FIG. 6 is a longitudinal cross-sectional view, partly in section, of a camera embodying the present invention.

As best shown in FIGS. 3 and 6, base section 38 is defined by a bottom wall 42 and a peripheral section defined by a pair of oppositely spaced side walls 43 and 44 and a pair of oppositely spaced end walls 45 and 46. For visual clarity, end wall 46 is not shown in FIG. 3.

The base section 38 includes a generally rectangular frame 47 for replaceably receiving a film container 48 (see FIG. 6) holding a plurality of film units 30 therein in stacked relation. Access to frame 47 for loading or withdrawing a film container 48 is provided by an access door 50 in the bottom or rear wall 42 of housing section 38.

Figure 4:
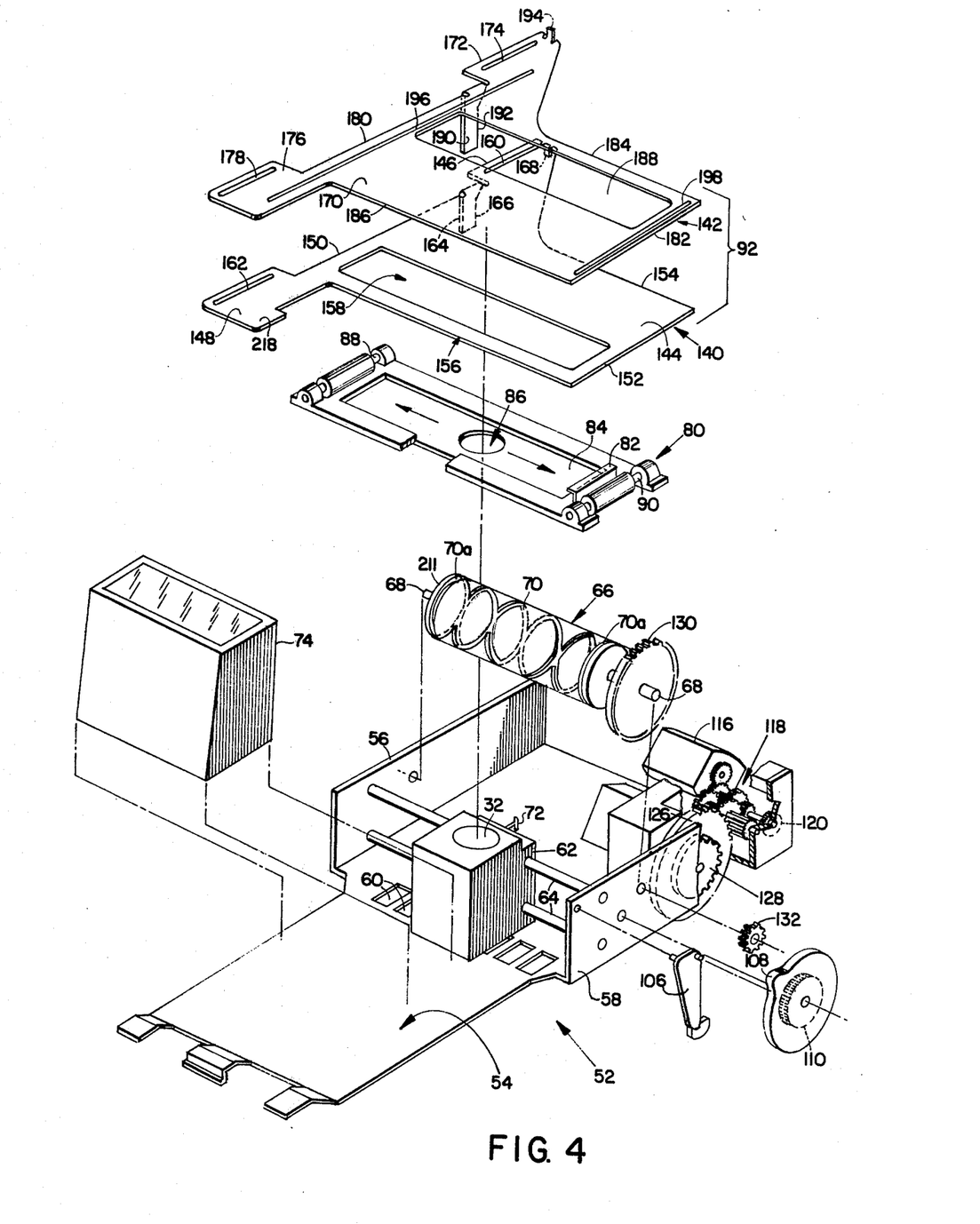
FIG. 4 is an exploded perspective view of a camera subassembly.

As best shown in FIG. 4, the major components of camera 10 are mounted on a mounting frame 52 that fits into base section 38 and is defined by a generally planar bottom wall or base plate 54 and a pair of laterally spaced upstanding side wall sections 56 and 58.

Located in base plate 54 are a plurality (7) of generally rectangular, equally spaced framing gate apertures 60 disposed in a laterally extending linear row and serving as gates, through which image forming light is transmitted, to define the image areas 28 on a portion of film unit 30 supported against the underside of plate 54 in registration with apertures 60. Thus the underside of base plate 54 in cooperation with later-to-be-described film supporting structure serves as means for defining the camera film plane 34.

The objective lens 32 is carried in a block-like lens carriage 62 that is slidably mounted on guide rods 64, extending between side walls 56 and 58, for movement along a linear path of travel over the apertures 60 which allows the lens 32 to be located at successive imaging positions in imaging relation with each of the framing gate apertures 60 in the linear row.

Camera 10 also includes means for automatically advancing the lens 32 along it path of travel in predetermined increments. These advancing means include a barrel cam 66 having the opposite ends of its fixed axial shaft 68 rotably mounted in side walls 56 and 58 and a double helix-like cam groove 70 formed in its cylindrical exterior surface; and a cam follower pin 72 formed on lens carriage 62 and which extends into and rides along groove 70. The manner in which the barrel cam 66 is rotatably driven to reciprocally advance the lens 32 relative to the row of framing gate apertures 60 will be discussed later herein.

Figure 8:
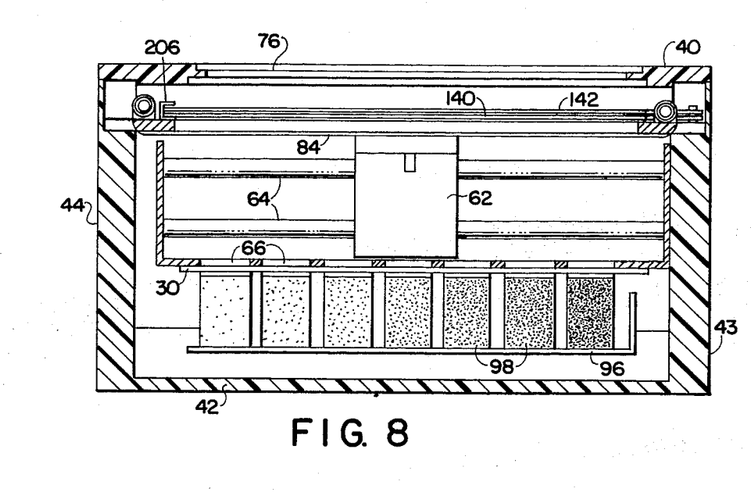
FIG. 8 is a cross-sectional view of the camera taken along line 8—8 of FIG. 7.

Also mounted on frame 52, on the opposite side of carriage 62 from cam 66, is an electronic strobe unit 74 which is operative to illuminate a document located on mounting glass 18. As best shown in FIGS. 3, 6, and 8, the forward wall section 40 of the camera housing 36 is provided with an elongated rectangular lens aperture 76 which is aligned with the framing gate apertures 60 and the lateral path of travel thereover of lens 42; and a generally rectangular aperture 78 through which the top portion of strobe unit 74 protrudes slightly beyond the exterior face of forward wall section 40. It will be noted that the aperture 22 in the mount 16 of console 12 is sufficiently large so both the lens aperture 76 and the strobe aperture 78 are in facing relation therewith when camera 10 is operatively positioned in mount 16.

In order to limit the transmission of light passing through lens aperture 76 to a single gate 60 having lens 32 in imaging relation therewith, camera 10 is provided with a light shield assembly 80 (see FIG. 4) that is secured to the opposite side walls of housing section 38, behind lens aperture 76, and extends over the path of travel of lens 32. The light shield assembly 80 includes a generally rectangular open frame 82, a flexible light opaque apron 84 positioned over the opening of frame 82 and having an opening 86 therein, and a pair of rollers 88 and 90 rotatably mounted on the opposite lateral ends of frame 82 and having the opposite ends of apron 84 secured thereto and on which the apron 84 is wound and unwound respectively thereby allowing apron 84 to move laterally across frame 82. In a preferred embodiment, the apron 84 is secured to the top surface of lens carriage 62 with its aperture 86 aligned with lens 32. In this manner, the flexible apron 84 is automatically driven along its lateral path of travel by the lens carriage 62. Image forming light transmitted through aperture 76 may pass only through aperture 86 and the aligned lens 32 so that apron 84 effectively blocks the light path to the other framing gate apertures 60 which do not have the lens 32 located in imaging relation therewith.

In addition to light shield assembly 80, the means for effecting the transmission of image forming light through lens 32 to expose an image area 28 on the film unit 30 includes a shutter 92, embodying the present invention, located over light shield 80 behind the aperture 76 (see FIG. 4).

The shutter 92 will be described in detail later on in this disclosure. Briefly, it includes opening and closing blades that are adapted to be driven by a control member associated with the barrel cam 66 between positions blocking and unblocking the exposure optical path through lens 32 to an image area 28. While the shutter 92 is open, the strobe unit 74 is fired to illuminate the document on glass 18. As best shown in FIGS. 3 and 8, the film unit 30 is supported against the underside of base plate 54 in alignment with the framing gate aperture 60 by means of a support assembly 94 comprising a base flange 96, mounted at the bottom of housing section 38, and a linear array of seven resilient blocks 98 on flange 96, each having a low friction cap 100 thereon, for resiliently urging a lateral row defining portion of film unit 30 against the underside of the seven framing gate apertures 60.

After a row of image areas 28 has been exposed, the film unit 30 is advanced longitudinally one row position, to locate the next successive lateral portion of film unit 30 in alignment with the row of framing gate apertures 60. As best shown in FIGS. 4 and 6, the means for incrementally advancing film unit 30 in the longitudinal direction include an elongated pick slide 102, mounted on the interior side of base housing section side wall 44 for longitudinal movement, and a pick 104 mounted on the trailing end of pick slide 102 and configured to extend into longitudinal slot in film container slot 48 to engage and advance the forwardmost film unit 30 therein incrementally relative to the exposure position defined by the row of framing gate apertures 60.

The pick slide 102 is biased toward housing end wall 46 by a spring (not shown) and is moved incrementally by the pivotal motion of a pick drive lever 106 that is pivotally mounted thereover on side wall 58 with its articulated bottom portion in engagement with a top ratchet section of pick slide 102. The pick lever 106 is in turn operated by a pick drive cam 108. Cam 108 has a smaller diameter gear 110 on its interior side which is rotatably mounted on side wall 58.

Pick drive cam 108, the barrel cam 66 and a pair of pressure applying rollers 112 and 114, extending between and being rotatably mounted on the opposed side walls 56 and 58 adjacent end wall 46, are adapted to be rotatably driven by a small high speed electrical motor 116 through a speed reduction gear train 118 coupled to the output shaft of motor 116.

One power transmission path of gear train 118 terminates in a roller drive gear 120 that is in mesh with a gear 122 on the end of upper roller 112.

A second power transmission path of gear train 118 terminates a timing gear 126 having an integrally formed smaller diameter barrel cam drive gear 128 on its exterior side. The gears in between motor 116 and the timing gear, defined by gears 126 and 128, is arranged so that the timing gear rotates through a single full revolution for each cycle of camera operation.

The barrel cam drive gear 128 is in mesh with a larger diameter barrel cam gear 130 fixedly secured to the barrel cam shaft 68 adjacent the interior of side wall 58. The diameter of gear 130 is twice the diameter of barrel cam drive gear 128 so that the barrel cam 66 is rotatably driven through half a revolution (180°) for each full revolution of the timing gear set defined by gears 126 and 128. That is, during each cycle of operation the barrel cam 66 rotates through 180° to operate the shutter 92 and locate the lens carriage 62 and the objective lens 32 therein at its next imaging position for the exposure of the next adjacent image area 28.

Secured to the outboard end of barrel cam shaft 68, on the exterior side of side wall 58, is a small diameter pick cam drive gear 132 that is in mesh with the gear 110 on the pick drive cam 108.

The ratio of the gears 132 and 110 are selected such that the pick drive cam 108 makes a single revolution for each seven cycles of camera operation. That is, the cam 108 only pivots pick drive lever 106 after each linear pass of the lens 32 along the row of framing gate apertures 60 so that after the last exposure in the row, cam 108 and pick lever 106 cooperate to advance the pick slide 102 one row position towards leading end wall 46 to locate the next row defining lateral portion of the film unit 30 in alignment with the framing gate apertures 60.

Each cycle of camera operation is controlled by an appropriate electrical control circuit (not shown) which is actuated by the manual depression of a cycle start button 134 mounted on the rear wall 42 of base housing section 38 as most clearly shown in FIG. 1.

After the exposure of the last image area 28 on film unit 30, camera 10 is once again actuated by depressing cycle start button 134 to energize motor 116. During this cycle of operation, the pick slide 102 is advanced longitudinally one more step so that the pick 104 advances the leading end of the film unit 30 into the bite of the pressure applying rollers 112 and 114. As the rollers 112 and 114 rotate, advancing the film unit 30 therebetween, they apply a compressive pressure to the film unit which discharges a fluid processing composition from a rupturable pod 136 at the leading end of film unit 30 and distributes the fluid between predetermined layers of the film unit 30 to initiate a development process that is well known to those skilled in the art of instant photograhy.

From the exit side of the rollers 112 and 114, the film unit 30 is advanced through a film exit slot 138 in housing end wall 46 to the exterior of camera housing 36. Should the film unit 30 be of the type which does not include an integral opacification system, a light tight imbibition chamber may be attached to end wall 46 over slot 138 for receiving film unit 30 and protecting it from ambient illumination for a short imbibition period.

Figure 7:
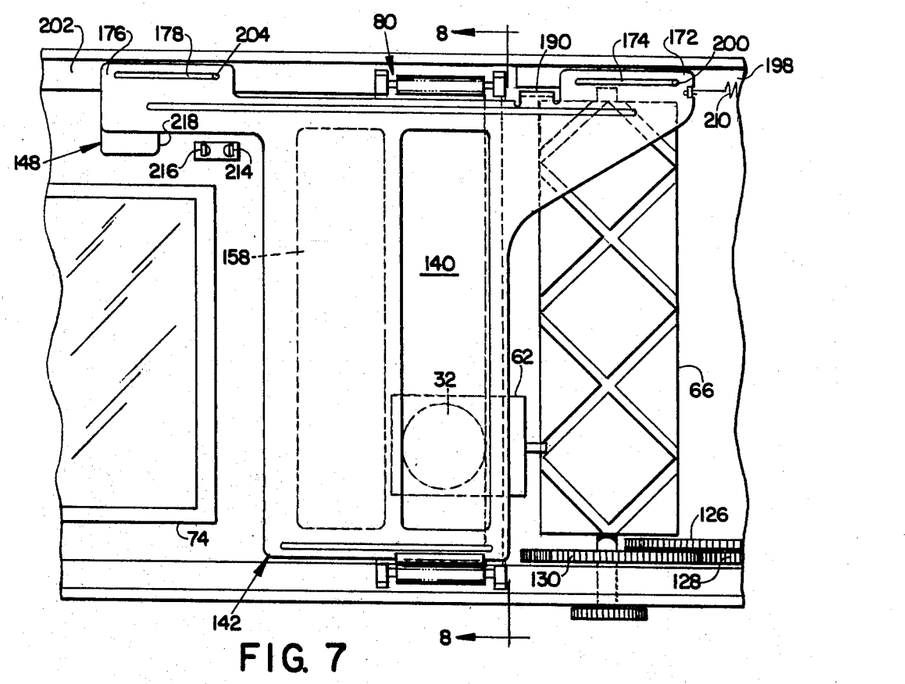
FIG. 7 is a plan view of a portion of the camera, partly in section, showing the camera shutter at its cocked position.

The structure and operation of shutter 92 will now be described with initial reference to FIGS. 4 and 7.

The shutter 92 comprises a lower opening shutter blade 140 and an upper closing blade 142 movable relative to one another, in the longitudinal direction, for selectively blocking and unblocking the transmission of image forming light along an optical path passing through the lens aperture 76 and the objective lens 32 to effect exposure of an image area 28 at the film plane 34.

The illustrated blades 140 and 142 are thin sheet metal piece parts formed of stainless steel, but they may be formed of any suitable stiff light opaque material including certain plastics which would allows the blades to be of molded construction.

The opening blade 140 includes a generally T-shaped horizontal section defined by a major laterally extending body section 144 and integrally formed forwardly and rearwardly extending guide and mounting arm sections 146 and 148, respectively, which also extend laterally out beyond the left (as viewed in FIG. 4) lateral edge 150 of body section 144. The right lateral edge and the opposed leading and trailing edges of body section of 144 carry the numerical designations 152, 154 and 156, respectively.

Integrally formed with body section 144 is an elongated rectangular laterally-extending opening blade aperture 158 disposed on the rear portion of body section 144 adjacent trailing edge 156. The forward arm section 146 is provided with a longitudinally extending guide slot 160 and the rearwardly extending arm section 148 is provided with a similar guide slot 162. Slots 160 ad 162 are configured to receive later-to-be-described guide pins to guide opening blade 140 during its longitudinal forward and aft movement.

Depending from the left lateral edge 150 at a point just behind forward arm section 146 is an integrally formed depending opening blade leg or tab 164 having a forwardly facing control surface or edge 166 the function of which will become apparent later. The forward arm section 146 is also provided with an integrally formed depending tab 168 for coupling a later-to-be-described biasing spring to opening blade 140.

The closing blade 142 is similar in some respects to the opening blade 140 in that it includes a generally T-shaped horizontal section defined by a body section 170; a forward arm section 172 having a longitudinal guide slot 174 therein; and a rear arm section 176 having a longitudinal guide slot 178 therein. The left and right lateral edges of body section 170 are designated 180 and 182 respectively. The leading and trailing edges of body section 170 carry the numerical designations 184 and 186 respectively.

Integrally formed with body section 170 is an elongated generally rectangular laterally extending closing blade aperture 188 disposed on a forward portion of body section 170 adjacent leading edge 184. The opening and closing blade apertures 158 and 188 are almost identical in size and shape and are at least coextensive with the lens opening 76 in the camera forward wall section 40.

The closing blade 144 also has a depending closing blade leg or tab 190 which is slightly longer than the corresponding opening blade leg 164. The closing blade leg 190 has a forwardly facing control surface or edge 192 thereon. Also, the forward arm section 172 is provided with an upturned tab 194 for securing a later-to-be-described biasing spring to the closing blade 142.

When the closing blade 142 is positioned on top of the opening blade 140 so that the leading edges 154 and 184 of body sections 144 and 170 are in alignment, the respective opening and closing blade apertures 158 and 188 are out of registration thereby locating shutter 92 in its closed or light blocking condition. When the blades 140 and 142 are in this configuration, the longer closing blade leg 190 is positioned to the outside of the shorter opening blade leg 164 and their respective leading control edges or surfaces 166 and 192 are in alignment.

In a preferred embodiment, the closing blade 142 includes a pair of laterally spaced and longitudinally extending protrusions 196 and 198 adjacent lateral edges 180 and 182 respectively which depend from the underside of blade 142 and serve as means for vertically spacing the opening and closing blades. The protrusions 196 and 198 may be integrally formed in closing blade 142 by stamping troughs in the upper surface of the blade 142 to define these protrusions on the underside.

The shutter 92 is mounted between the underside of housing forward wall section 40 and the light shield assembly 80. As best shown in FIG. 3, the interior side of sidewall 43 of housing section 38 is provided with a forward longitudinally extending horizontal blade mounting and guide surface 198 having a vertical guide pin 200 extending upwardly therefrom and a similar rear blade mounting and guide surface 202 having a similar guide pin 204 thereon. The forward arm section 146 of opening blade 140 rests on forward surface 198 with guide pin 200 extending through a forward blade slot 160. The rear arm section 148 rests on rear surface 202 with guide pin 204 extending through longitudinal guide slot 162. As best shown in FIG. 8, the right lateral edge 152 of opening blade 140 extends into a longitudinally extending U-shaped guide channel 206 mounted on the right hand side of the light shield support frame 82.

The closing blade 142 rests on top of the opening blade 140 with the guide pins 200 and 204 extending through the longitudinal slots 174 and 178 on the forward and rear arm sections 172 and 176 of the closing blade 142. The right lateral edge 182 of closing blade 142 extends into the U-shaped guide channel 206 over the right lateral edge 152 of opening blade 140.

As best shown in FIG. 6, the bottom opening blade 140 is biased toward housing wall 46 by means of a spring 208 having one end secured to wall 46 and its opposite end secured to tab 168 at the leading end of opening blade arm section 146. The closing blade 142 is also biased in the same direction by means of a spring 210 having one end secured to housing wall 46 and its opposite end secured to tab 194 at the leading end of closing blade arm section 172.

With the opening and closing blades 140 and 142 mounted in superposed relation in the manner just described, the depending legs 164 and 190 are located so as to move longitudinally into a space between the left end 211 (as viewed in FIG. 4) of barrel cam 66 and the interior surface of side wall 56 adjacent thereto. As best shown in FIG. 4, the depending legs 164 and 190 are both short enough so as to be able to pass over and beyond the end of the barrel cam shaft 68 that is rotably coupled to wall 56.

As noted earlier, the strobe unit 74 is intended to illuminate the document to be copied supported on document glass 18 and therefore it will be fired when shutter 92 is in its open or unblocking condition. The means for firing the strobe unit 74 include a normally open switch 212 (see FIGS. 9–12) forming part of a flash firing circuit (not shown). Switch 212 includes a fixed contact 214 and a movable contact 216 that is normally spaced from contact 214 to maintain switch 212 in its open condition. The switch 212 is mounted in camera housing 36 so that its movable contact 216 faces and is located in the path of travel of a flash firing tab extension 218 (see FIG. 7) on the rear arm section 148 of opening blade 140. As will become apparent, in response to movement of opening blade 140 from an initial cocked position to a terminal position, rendering shutter 92 in its open condition to initiate an exposure, firing tab 218 engages movable contact 216 and advances it into engagement with fixed contact 214 to close switch 212 and thereby provide a single pulse logic signal which actuates the flash fire circuit to fire strobe unit 74.

Figure 9:
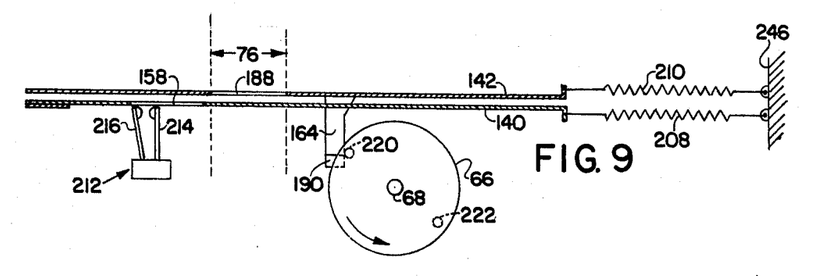
FIGS. 9–12 are diagrammatic views of the camera shutter and a shutter control mechanism showing the sequence of operation of the opening and closing shutter blades.
Figure 13:
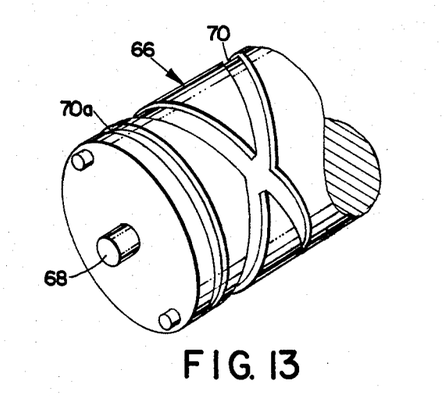
FIG. 13 is a perspective view of a portion of a barrel cam showing a pair of shutter control pins thereon.

Camera 10 is provided with means for controlling the movement of the opening and closing shutter blades 140 and 142 to move them between positions blocking and unblocking the optical path through lens aperture 76 and objective lens 32. The means for controlling movement of the shutter blades include a pair of diametrically opposed blade control pins 220 and 222 mounted on the left end 211 of barrel cam 66, as best shown in FIG. 13, and extending outwardly therefrom in a direction parallel to axle shaft 68 toward the sidewall 56. As best shown in FIG. 9, when cam 66 is in its rest position following a cycle of camera operation, the first control pin 220 is located in the longitudinal path of travel of the forward control edges or surfaces 166 and 192 of blade legs 164 and 190, respectively, and maintains both blades in their initial cocked positions against the biasing force provided by springs 208 and 210 which urge blades 140 and 142 toward the housing end wall 46.

In FIGS. 9–12, the vertical dotted parallel lines indicate the location of the optical path defined by the lens aperture 76 and the row of framing gate apertures 60 therebelow. In FIG. 9, it will be noted that pin 220 acting on the shorter leg 164 locates the opening blade 140 at an initial position where it blocks the optical path and locates the opening blade aperture 158 behind (to the left) of the optical path. At the same time, pin 220 acts on the longer leg 190 and locates the closing blade 140 at its initial position with the closing blade aperture 188 in registration or unblocking relation to the optical path.

In the operation of shutter 92, the opening blade 140 will be moved from the initial cocked position blocking the optical path to a terminal position unblocking the optical path to initiate the exposure of an image area 28. Thereafter, the closing blade 42 will be moved from the initial cocked position unblocking the optical path to a terminal position blocking the optical path to terminate the exposure. Following termination of the exposure, the blades 140 and 142 will be reset in their respective initial positions.

In FIG. 9, both the opening blade 140 and the closing blade 142 are shown in their initial or cocked position wherein the blade apetures 158 and 160 are out of registration to define a closed shutter condition in which the opening blade 140 blocks the optical path. The blades 140 and 142 are maintained in this configuration by locating the pin 220 at a first position shown in FIG. 9.

Figure 10:
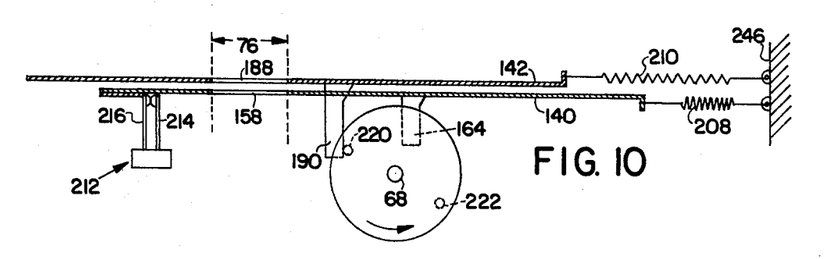

In response to counterclockwise rotation of cam 66, pin 220 rotates to a second position shown in FIG. 10 where it becomes disengaged from the control surface 166 of the shutter opening blade leg 164 but remains in engagement with the control surface 192 of the longer closing blade leg 190. In response to movement of pin 220 from its first position, through a predetermined arc of approximately 7°, to a second position, the opening blade 140 moves to the right under the influence of biasing spring 208 to its terminal position wherein the opening blade aperture 158 is in registration with closing blade aperture 188 thereby unblocking the optical path to effect exposure of an image area 28. As the blade aperture 158 comes into registration with aperture 188, the firing tab 218 on the opening blade 140 closes switch 212 to fire the strobe unit 74.

Figure 11:
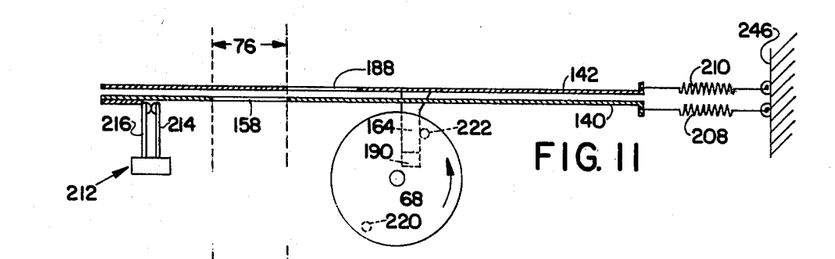

In response to further counterclockwise rotation of cam 66, the pin 220 moves further downwardly and becomes disengaged from control surface 192 of the longer leg 190 on closing blade 142, thereby releasing the closing blade for movement to its terminal position under the influence of biasing spring 210 to terminate the exposure as shown in FIG. 11. Now the optical path is blocked by the closing blade 142 because its aperture 188 has moved to the right out of registration with the opening blade aperture 158 which remains in alignment with the optical path.

Following exposure termination, and in response to further clockwise rotation of barrel cam 66, the second pin 222 on the end 211 of cam 66 advances into the path of travel of the depending legs 164 and 190 and engages the control surfaces 166 and 192.

Figure 12:
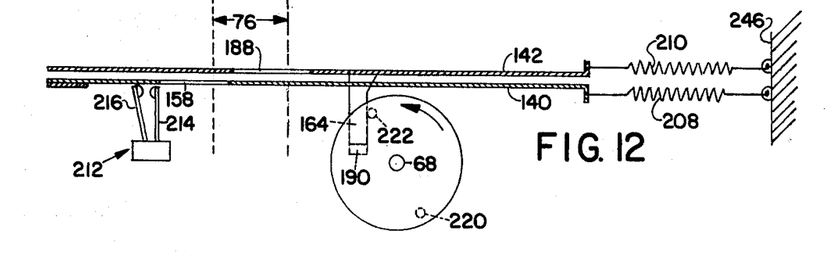

As best shown in FIG. 12, further counterclockwise rotation of the cam 66 causes the pin 222 to push both blades to the left in the closed shutter condition where their apertures 158 and 188 are out of registration until both blades are relocated at their respective initial positions and the pin 222 occupies the initial position previously occupied by the first pin 220 prior to the half revolution of cam 66 during the course of a cycle of camera operation.

As noted earlier, the barrel cam 66 is designed to rotate through one-half revolution (180°) for each cycle of camera operation. For approximately the first 40° of cam rotation, the follower pin 72 on lens carriage 62 rides in a dwell section of the cam groove 70 that is perpendicular to the axis of cam rotation so there is no lateral movement of the lens carriage 62. It is during this rotation of the cam 66 through its first arc segment that the pin 220 (or 222) rotates from its initial position to its second position and then to its third position to operate shutter 92 and thereby effect the exposure of an image area 28. After the exposure phase, for the next 140° of rotation, the groove 70 is at an angle to the axis of barrel cam 66 and the lens is moved laterally to the next imaging position. It will be noted that the groove 70 is configured to provide longer dwell sections at its opposite ends so that when the lens carriage is positioned at an end of the row image area 28, the subsequent rotation of the cam 66 does not cause lateral movement of the lens carriage 62 but rather it remains at the end of the row position while the film unit is advanced longitudinally by the pick slide 102 so that lens 32 is in position in preparation for exposing the first image area 28 in the next row. It is during this rotation of the barrel cam 66 through its second arc segment (140°) that the second control pin on the end 211 of cam 66 recocks the shutter blades 140 and 142 by moving them back from their respective terminal positions to their respective initial positions.

In operation, camera 10 is loaded with a film pack 48 holding a plurality of film units 30 therein and is mounted on the camera/projector mount 16 of console 12. The lens carriage 62 is positioned at the framing gate aperture 60 at one end of the row of apertures and the first row defining lateral portion of film unit 30 is located in the exposure position under the row of apertures 60. The barrel cam 66 is in its initial position shown in FIG. 9 whereby the control pin 220 (or 222) is at its first position releasably holding both the opening and closing blades 140 and 142 at their initial or cocked positions.

In response to the operator depressing cycle start button 134, the motor 116 is energized causing the rotation of the pressure applying rollers 112 and 114, the barrel cam 66, and the pick drive cam 108 as previously described.

The barrel cam 66 begins to rotate in a counterclockwise direction thereby moving the control pin 220 (or 222), from its first position shown in FIG. 9 to its second position shown in FIG. 10 whereby pin 220 becomes disengaged from the shorter leg 164 of the open blade 140 and release it for movement under the influence of spring 208 to its terminal position setting shutter 42 in its open condition. During the movement of the opening blade 140 the tab 218 thereon closes the strobe fire switch 212 and the strobe unit 74 is fired to illuminate a document on document mounting glass 18 and thereby effect the exposure of the first image area 28 in the first row.

In response to further clockwise rotation of cam 66 the control pin 220 is moved from its second position to its second position thereby becoming disengaged from the longer leg 190 of closing blade 142 and releasing blade 142 for movement to its terminal position by spring 210 to terminate the exposure. Following the exposure, the barrel cam 66 rotates through its second arc segment for moving the lens carriage 62 laterally to position the lens in imaging relation with the next framing gate aperture 60 in the row and also moving the control means such that the second pin 222 thereon engages the legs 164 and 190 of the opening and closing blades 140 and 142 and moves them back to their respective initial or cocked positions. At the end of the 180° rotation, the second pin 222 occupies the intitial position previously occupied by the first control pin 220 at the beginning of the cycle of camera operation.

The remaining image areas 28 in the first row are exposed in response to repeated actuations of the camera cycle start switch 134. After the last image area 28 in the row has been exposed, the next actuation of button 134 causes the pick cam 108 to complete its full revolution and thereby actuate drive pick drive lever 106 to operate pick slide 102 and advance the next lateral row defining section of the film unit 30 to the exposure position under the row of gate apertures 60. After the exposure of the last image area in the last row, the next actuation of button 134 causes the pick slide 102 to advance one more step to engage the leading end of film unit 30 in the bite of the pressure applying rollers 112 and 114 which apply a compressive pressure progressively along the length of the film unit 30 being advanced therebetween to effect fluid distribution for the initiation of the development process.

In the illustrated embodiment, it has been shown that in response to driving the barrel cam 66 through 180° the shutter 92 is operated first to effect exposure of an image area 28 and then the lens carriage 62 is moved, if necessary, to locate the lens 32 therein in imaging relation with the next image area 28 to be exposed. Those skilled in the art will appreciate, however, that the sequence may be reversed without departing from the spirit of the present invention. That is, in response to initial rotation of the barrel cam 66 the lens carriage 62 may be moved, if necessary, to its next position and then shutter 92 may be operated to effect exposure. In such an embodiment, the shutter blades 140 and 142 would be located at their respective terminal positions at the end of a cycle of operation rather than in their respective initial positions. This would mean that the shutter 92 would be recocked during the first portion of barrel cam rotation and then would be fired during the second portion of the rotation.

Also, while the barrel cam 66 in the illustrated camera 10 is designed to rotate through a half revolution for each cycle of camera operation, those skilled in the art will appreciate that camera 10 may be configured so that cam 66 rotates through a full 360° revolution during each cycle of camera operation and the means for controlling movement of the shutter blade may comprise a single control pin on the end of cam 66. That is, a single pin will maintain both the opening and closing blades 140 and 142 in their respective initial positions; then rotate from the initial position to a second position to release the opening blade 140 for movement to its unblocking position while maintaining the closing blade 142 in its initial position; thereafter rotate from the second position to the third position to release the closing blade 142 for terminating exposure; and thereafter rotate from the third position, in the same direction back to the initial position during which the single pin will recock the shutter blades 140 and 142.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A camera for exposing a plurality of image areas on a single card-like film unit, said camera comprising:
   means for supporting such a film unit at a film plane;
   means for defining a plurality of image areas disposed in a row on the film unit at said film plane;
   an image forming lens;
   means mounting said lens for movement along a path of travel substantially parallel to said row of image areas;
   means, including a rotatable member, for advancing said lens in increments along said path to successively locate said lens in imaging relation with each of said image areas for exposure;
   a shutter for selectively blocking and unblocking the transmission of image forming light along an optical path passing through said lens to effect exposure of an image area, said shutter including an opening blade mounted for movement between an initial blocking position and terminal unblocking position for initiating an exposure, a closing blade mounted for movement between an initial unblocking position and a terminal blocking position for terminating the exposure, and means for biasing said opening and closing blades toward their respective terminal positions; and
   means for controlling movement of said opening and closing blades including a control member mounted for rotation and coupled to said rotatable member for simultaneous rotation therewith for releasably holding said opening and closing blades at their respective initial positions when said rotatable member is at a predetermined initial position, for releasing said opening blade for movement to its said terminal unblocking position while maintaining said closing blade at its said initial position in response to rotation of said rotatable member through a first arc segment past said initial position and for releasing said closing blade for movement to its said terminal position in response to rotation of said rotatable member through a second arc segment beyond said first arc segment.

2. The camera of claim 1 wherein said control means further includes means for returning said opening and closing blades to their respective said initial positions from their respective said terminal positions in response to rotation of said rotatable member through a third arc segment beyond said second arc segment.

3. The camera of claim 2 wherein the sum total of the angles defined by said first, second and third arc segments does not exceed 180°.

4. The camera of claim 1 wherein said opening blade includes a first tab, said closing blade includes a second tab that is configured differently from said fist tab so that said control member engages both said first and second tabs when said rotatable member is located at said initial position, becomes disengaged from said first tab but remains in engagement with said second tab in response to rotation of said rotatable member through said first arc segment, and thereafter becomes disengaged from said second tab in response to rotation of said rotatable member through said second arc segment.

5. The camera of claim 4 wherein said control means further includes means engageable with both said first and second tabs for returning said opening and closing blades to their respective initial positions in response to rotation of said rotatable member through a third arc segment beyond said second arc segment.

6. The camera of claim 5 wherein said rotatable member includes a barrel cam, said control member includes a first control pin projecting outwardly from one end of said barrel cam and said returning means includes a second control pin projecting outwardly from said cam end in diametrically opposed relation to said first pin.

7. The camera of claim 4 wherein said control tab is longer than said first tab so that said control member, in response to rotation of said rotatable member, becomes disengaged from said first tab before becoming disengaged from said second tab to effect sequential movement of said opening and closing blades from their respective said initial positions to their respective said terminal positions.

8. The camera of claim 1 wherein said rotatable member does not effect advancement of said lens when rotated through said first and second arc segments but does effect required advancement of said lens when rotated through a third arc segment beyond said second arc segment.

9. The camera of claim 8 wherein said control means further includes means responsive to rotation of said rotatable member through said third arc segment for returning said opening and closing blades to their respective said initial positions from their respective said terminal positions.

10. Photographic apparatus for exposing a film unit, said apparatus comprising:
means for supporting the film unit at a film plane in position for exposure;
means for defining an optical path along which image forming light is transmitted to expose the film unit at said exposure position;
a shutter for selectively blocking and unblocking said optical path to control the transmission of image forming light therealong, said shutter including an opening blade mounted for movement between an initial blocking position and a terminal unblocking position for initiating an exposure, a closing blade mounted for movement between an initial unblocking position and a terminal blocking position for terminating the exposure, and means for biasing said opening and closing blades toward their respective terminal positions; and
means for controlling movement of said opening and closing blades including a control member mounted for rotational movement between first, second and third positions and operable when in said first position for releasably holding said opening and closing blades in their respective initial positions against the force applied thereto by said biasing means, and control member being responsive to movement from said first to said second position for releasing said opening blade for movement to its terminal unblocking position to initiate the exposure while maintaining said closing blade at its said initial unblocking position and thereafter being responsive to movement from said second to said third position for releasing said closing blade for movement to its said terminal blocking position to terminate the exposure.

11. Photographic apparatus for exposing a film unit, said apparatus comprising:
means for supporting the film unit at a film plane in position for exposure;
means for defining an optical path along which image forming light is transmitted to expose the film unit at said exposure position;
a shutter for selectively blocking and unblocking said optical path to control the transmission of image forming light therealong, said shutter including an opening blade mounted for movement between an initial blocking position and a terminal unblocking position for initiating an exposure, a closing blade mounted for movement between an initial unblocking position and a terminal blocking position for terminating the exposure, and means for biasing said opening and closing blades toward their respective terminal positions; and
control means for controlling movement of said opening and closing blades including reset means for moving said opening and closing blades from their respective terminal positions back to their respective initial positions following operation of said shutter to effect an exposure, said control means also including a control member mounted for rotational movement in one direction between sequential first, second, third and fourth positions and operable when in said first position for releasably holding said opening and closing blades in their respective initial positions against the force applied thereto by said biasing means, said control member being responsive to movement from said first to said second position for releasing said opening blade for movement to its terminal unblocking position to initiate the exposure while maintaining said closing blade at its said initial unblocking position, then being responsive to movement from said second to said third position for releasing said closing blade for movement to its said terminal blocking position to terminate the exposure, and thereafter being responsive to movement from said third to said fourth position for operating said reset means to move said opening and closing blades back to their respective initial positions.

12. Photographic apparatus for exposing a film unit, said apparatus comprising:
- means for supporting the film unit at a film plane in position for exposure;
- means for defining an optical path along which image forming light is transmitted to expose the film unit at said exposure position;
- a shutter for selectively blocking and unblocking said optical path to control the transmission of image forming light therealong, said shutter including an opening blade mounted for movement between an initial blocking position and a terminal unblocking position for initiating an exposure, a closing blade mounted for movement between an initial unblocking position and a terminal blocking position for terminating the exposure, and means for biasing said opening and closing blades toward their respective terminal positions, said opening blade including a first control surface that moves along a given path of travel in response to movement of said opening blade and said closing blade including a second control surface that travels along a second path of travel that is parallel to but wider than said given path of travel; and
- means for controlling movement of said opening and closing blades including a control member mounted for movement between first, second and third positions and operable when in said first position for releasably holding said opening and closing blades in their respective initial positions against the force applied thereto by said biasing means, said control member being responsive to movement from said first to said second position for releasing said opening blade for movement to its terminal unblocking position to initiate the exposure while maintaining said closing blade at its said initial unblocking position and thereafter being responsive to movement from said second to said third position for releasing said closing blade for movement to its said terminal blocking position to terminate the exposure, said control members also being configured to move along a path of travel that intersects said given and second paths of travel so as to be initially located in blocking relation to both said given and second paths of travel when said control member is in said first position, and being located in unblocking relation to said given path and in blocking relation to said second path when located in said second position and thereafter being located in unblocking relation to said second path when located in said third position.

13. Photographic apparatus for exposing a plurality of image areas on a single film unit, said apparatus comprising:
- means for supporting the film unit at a film plane in position for exposure;
- means for defining an optical path along which image forming light is transmitted to expose the film unit at said exposure position, said optical path defining means including a lens mounted for movement relative to the film unit to a plurality of imaging positions corresponding to said plurality of image areas;
- means for automatically advancing said lens in increments to each of said imaging positions and including a movable member;
- a shutter for selectively blocking and unblocking said optical path to control the transmission of image forming light therealong, said shutter including an opening blade mounted for movement between an initial blocking position and a terminal unblocking position for initiating an exposure, a closing blade mounted for movement between an initial unblocking position and a terminal blocking position for terminating the exposure, and means for biasing said opening and closing blades toward their respective terminal positions; and
- means for controlling movement of said opening and closing blades including a control member mounted for movement between first, second and third positions and operable when in said first position for releasably holding said opening and closing blades in their respective initial positions against the force applied thereto by said biasing means, said control member being responsive to movement from said first to said second position for releasing said opening blade for movement to its terminal unblocking position to initiate the exposure while maintaining said closing blade at its said initial unblocking position and thereafter being responsive to movement from said second to said third position for releasing said closing blade for movement to its said terminal blocking position to terminate the exposure, said control member being coupled to said movable member for simultaneous movement thereby to said first, second and third positions to coordinate the operation of said shutter with the location of said lens at each of said imaging positions.

14. The apparatus of claim 1 wherein said control member and said movable member are mounted for rotation about a common axis.

15. A shutter mechanism for selectively blocking and unblocking an optical path along which imaging forming light is transmitted to expose a film unit located at a film plane, said shutter mechanism comprising:
- an opening blade mounted for movement between an initial blocking position and a terminal unblocking position for initiating an exposure;
- means for biasing said opening blade toward its said terminal position;
- a closing blade mounted for movement between an initial unblocking position and a terminal blocking position for terminating the exposure;
- means for biasing said closing blade toward its said terminal position; and
- means for controlling movement of said opening and closing blades including a control member mounted for rotational movement between first, second, third and fourth positions and operable when in said first position for releasably holding said opening and closing blades in their respective initial positions, said control member being responsive to movement from said first to said second position for releasing said opening blade for movement to its said terminal position under the influence of said oening blade biasing means while retaining said closing blade in its said initial position, then being responsive to movement from said second to said third position for releasing said closing blade for movement to its said terminal position under the influence of said closing blade biasing means, and thereafter being responsive to movement from said third to said fourth position for returning said opening and closing blades to their respective initial positions from their respective terminal positions.

* * * * *